(12) United States Patent
Rowland et al.

(10) Patent No.: US 7,494,147 B2
(45) Date of Patent: Feb. 24, 2009

(54) LOCKING SYSTEM FOR PIVOTING TRAILER COUPLER ASSEMBLY

(75) Inventors: Edward R. Rowland, Etiwanda, CA (US); Thomas W. Hunsucker, Alta Loma, CA (US)

(73) Assignee: Lippert Components, Inc., Goshen, IN (US)

( * ) Notice: Subject to any disclaimer, the term of this patent is extended or adjusted under 35 U.S.C. 154(b) by 366 days.

(21) Appl. No.: 11/286,147

(22) Filed: Nov. 22, 2005

(65) Prior Publication Data

US 2006/0131836 A1 Jun. 22, 2006

Related U.S. Application Data

(60) Provisional application No. 60/630,825, filed on Nov. 23, 2004.

(51) Int. Cl.
*B60D 1/00* (2006.01)
(52) U.S. Cl. .................... 280/491.3; 403/52
(58) Field of Classification Search ............ 280/491.3, 280/491.1, 480.1; 403/52, 161
See application file for complete search history.

(56) References Cited

U.S. PATENT DOCUMENTS

| | | | |
|---|---|---|---|
| 2,341,965 A | 2/1944 | Wagner | |
| 2,391,603 A | 12/1945 | Wagner | |
| 2,399,746 A | 5/1946 | Klaus et al. | |
| 2,733,936 A * | 2/1956 | Tate | 280/491.3 |
| 2,918,310 A * | 12/1959 | Carson | 280/479.3 |
| 2,958,543 A * | 11/1960 | Cooper et al. | 280/491.3 |
| 3,026,975 A | 3/1962 | Yoder | |
| 3,110,507 A | 11/1963 | Riner | |
| 3,185,499 A * | 5/1965 | Reese | 280/406.2 |
| 3,740,078 A * | 6/1973 | Murr | 280/478.1 |
| 3,979,138 A | 9/1976 | George et al. | |
| 4,306,734 A | 12/1981 | Swanson et al. | |
| 4,398,742 A | 8/1983 | Sanders | |
| 5,011,176 A | 4/1991 | Eppinette | |
| 5,147,095 A | 9/1992 | Duncan | |
| 5,226,657 A * | 7/1993 | Dolphin | 280/478.1 |
| 5,503,423 A | 4/1996 | Roberts et al. | |
| 5,624,129 A * | 4/1997 | Clark, Jr. | 280/478.1 |
| 5,890,617 A | 4/1999 | Rowland et al. | |
| 5,895,066 A * | 4/1999 | Headlee | 280/414.1 |
| 5,992,871 A | 11/1999 | Rowland et al. | |
| 6,364,337 B1 | 4/2002 | Rowland et al. | |

(Continued)

*Primary Examiner*—Kevin Hurley
(74) *Attorney, Agent, or Firm*—Fred C. Hernandez; Mintz, Levin, Cohn, Ferris, Glovsky and Popeo P.C.

(57) ABSTRACT

Disclosed are improved devices for rotatably-coupled trailer coupler assemblies. The disclosed devices include a lock assembly that can be used to lock and unlock a coupler arm of a swing-type trailer coupler assembly in predetermined positions, such as towing and storage positions. The lock assembly includes a lock member that moves between a locked an unlocked state. In the locked state, the lock member locks the coupler arm of the assembly in a predetermined position, such as a towing position. In the unlocked state, the lock member does not interfere with the coupler arm such that the coupler arm is free to move between the towing and storage orientations. An actuator is coupled to the lock assembly. The actuator can be actuated to transition the lock member between the locked and unlocked states. The lock assembly is fixedly mounted to the coupler assembly so that a user does not have to insert and remove the lock member.

14 Claims, 14 Drawing Sheets

U.S. PATENT DOCUMENTS

| | | |
|---|---|---|
| 6,527,292 B2 | 3/2003 | Adair |
| 6,595,540 B1 | 7/2003 | MacKarvich |
| 6,869,095 B2 * | 3/2005 | Roll et al. ................ 280/491.3 |
| 7,021,645 B1 | 4/2006 | Stettler |
| 2003/0011168 A1 | 1/2003 | Svensson |
| 2003/0141698 A1 | 7/2003 | MacKarvich |
| 2004/0135345 A1 * | 7/2004 | Roll et al. ................ 280/491.1 |
| 2005/0218627 A1 | 10/2005 | Rowland |

* cited by examiner

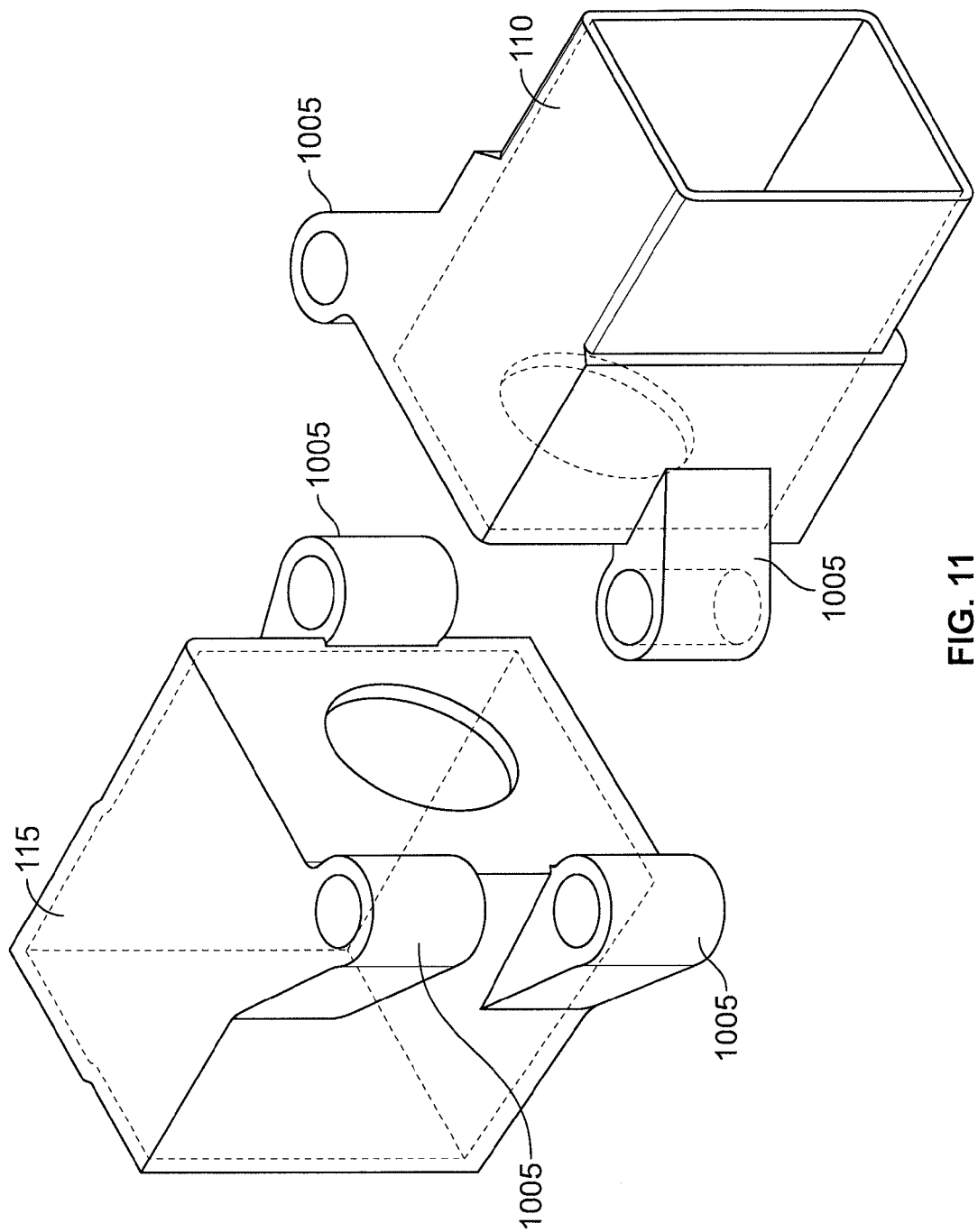

LOCKING SYSTEM FOR PIVOTING TRAILER COUPLER ASSEMBLY

REFERENCE TO PRIORITY DOCUMENT

This application claims priority of U.S. Provisional Patent Application Ser. No. 60/630,825 entitled "Locking System for Pivoting Trailer Hitch", filed Nov. 23, 2004. Priority of the filing date of Nov. 23, 2004 is hereby claimed, and the disclosure of the Provisional Patent Application is. hereby incorporated by reference in its entirety.

BACKGROUND

The present disclosure relates to trailers. More particularly, the present disclosure relates to a locking system for a pivoting trailer coupler assembly.

For towing purposes, users of boats will position the boat atop a boat trailer during transport of the boat. The boat trailer typically includes a main, support section that is sized to support the entire boat. Thus, the support section is typically at least as long as the entire length of the boat. A towing or coupler arm typically extends forwardly from the support section such that the towing arm increases the overall length of the trailer. The towing arm can be attached to a towing vehicle using a coupler located at a front tip of the towing arm.

Due to the size requirements of the support section and the towing arm, the boat trailer is usually longer than the boat that it carries. As a result, storing certain sized boats and their trailers in a confined space, such as in the boat owner's garage, can be difficult, if not impossible. This storage constraint often forces some people to buy smaller boats, as they do not have access to storage space that is large enough to contain the large trailer.

On the other hand, many boaters have a near fanatical devotion to their sport and refuse to sacrifice the size of the boat in order to accommodate a small storage space. Consequently, some boaters resort to expensive and time consuming measures in order to store a boat of a desired size. For example, some boaters have been known to enlarge the sizes of their garage spaces in order to create sufficient room to store boats indoors.

Other boaters may purchase specialized boat trailers where the front of the trailer, specifically the front towing arm area, can be adjusted in size to fit within small areas. There currently exist trailers with hinged towing arms that swing out of the way to a stowing position when not in use, so that the towing arm does not increase the overall length of the trailer when the trailer is in storage. Such devices use first and second passageways that are positioned on the sides of a trailer front arm. The passageways are aligned with one or more holes on plates positioned on a rotating towing arm. A rotator pin is then inserted into a first passageway and the holes of the plates such that the rotator pin acts as an axis of rotation to permit the towing arm to be rotated to the stowing position when not in use.

A removable pin is inserted into the second passageway to lock the towing arm in the towing position. The removable pin is removed from the passageway to unlock the towing arm. It can be unwieldy for the user to have to insert and remove the removable pin in order to lock and unlock the towing arm. Moreover, the removable pin can be easily lost when the pin is removed from the passageway. In view of the foregoing, there is a need for improved locking systems for pivoting trailer couplers.

SUMMARY

Disclosed are improved devices for rotatably-coupled trailer coupler assemblies. The disclosed devices include a lock assembly that can be used to lock and unlock a coupler arm of a swing-type trailer coupler assembly in predetermined positions, such as towing and storage positions. The lock assembly includes a lock member that moves between a locked an unlocked state. In the locked state, the lock member locks the coupler arm of the assembly in a predetermined position, such as a towing position. In the unlocked state, the lock member does not interfere with the coupler arm such that the coupler arm is free to move between the towing and storage orientations. An actuator is coupled to the lock assembly. The actuator can be actuated to transition the lock member between the locked and unlocked states. Advantageously, the lock assembly is fixedly mounted to the coupler assembly so that a user does not have to insert and remove the lock member. The lock member can be, for example, a pin.

In one aspect, there is disclosed an assembly for attaching a trailer to a towing vehicle. The assembly includes a coupler arm, a front arm, a lock member, and an actuator coupled to the lock member. The coupler arm has a front end and a rear end. The front end of the coupler arm is configured for attachment to a towing vehicle. The front arm has a rear end adapted to be attached to a front of the trailer and a front end rotatably attached to the rear end of the coupler arm, wherein the coupler arm rotates relative to the front arm between (1) an operating position wherein the front arm and the coupler arm extend along a common longitudinal axis, and (2) a stow position wherein the coupler arm is oriented cross-wise to the front arm. The lock member is movable into a locked state wherein the lock member locks the front arm in the operating position. The lock pin is fixedly mounted to the assembly. The actuator is actuated to cause the lock member to move into the locked state.

In another aspect, there is disclosed a trailer comprising a support section configured to support a load and a front arm extending forwardly from the support section. The trailer further comprises a coupler arm rotatably attached to the front arm. The coupler arm is configured to be attached to a towing vehicle, wherein the coupler arm rotates relative to the front arm between (1) an operating position wherein the front arm and the coupler arm extend along a common longitudinal axis, and (2) a stow position wherein the coupler arm is oriented cross-wise to the front arm. The trailer further comprises a lock assembly fixedly attached to the trailer. The lock assembly includes: (a) a lock member that engages the coupler arm to lock the coupler arm in the operating position; and (b) an actuator that is actuated to cause the lock member to engage the coupler arm.

The details of one or more embodiments are set forth in the accompanying drawings and the description below. Other features, objects, and advantages will be apparent from the description and drawings, and from the claims.

DESCRIPTION OF DRAWINGS

FIG. 11 shows a pivoting coupler assembly that includes interlocking knuckles or barrel hinges that define pivoting or locking shafts for receipt of pins.

Like reference symbols in the various drawings indicate like elements.

DETAILED DESCRIPTION

Described herein are improved devices for rotatably-coupled trailer coupler assemblies or swing tongues. An integrated locking device can be used to easily lock a front arm of the trailer coupler assembly in a towing position.

Figure 1:
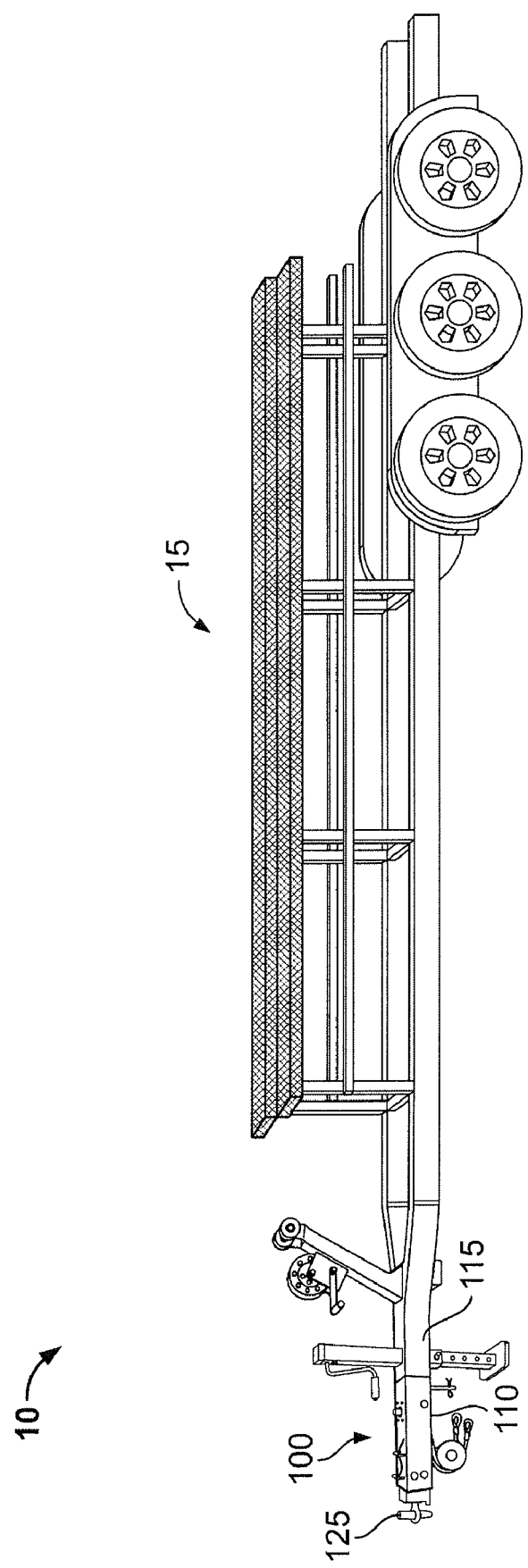
FIG. 1 shows a side view of a boat trailer.
Figure 2:
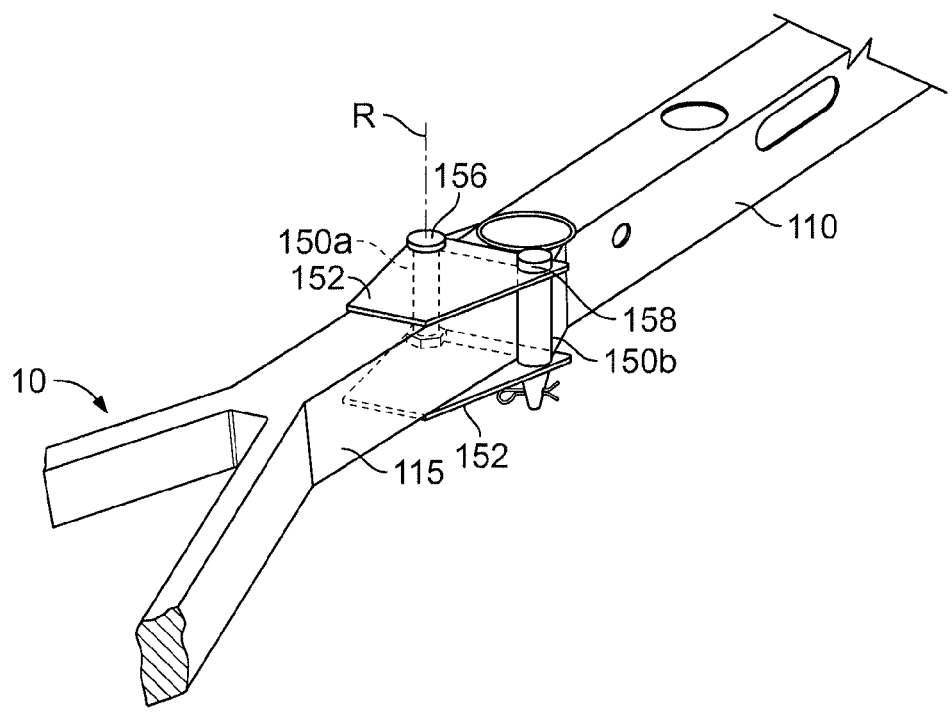
FIG. 2 shows a perspective view of a pivoting trailer coupler device.

FIG. 1 shows a perspective view of a boat trailer 10 having a support section 15 configured to provide support to a boat or other load in a well-known manner. The boat trailer 10 includes a pivoting coupler assembly 100 for coupling the trailer 10 to a towing vehicle. For clarity of illustration, the structural details of the coupler assembly 100 are not shown in FIG. 1. FIG. 2 (described below) show a detailed view of an exemplary coupler assembly. The coupler assembly 100 includes a coupler arm with a front coupler that attaches to the hitch on a towing vehicle. The coupler arm or tongue pivots between a towing position or orientation and a storage position or orientation, as described in detail below. Although described herein in the context of a boat trailer, it should be appreciated that the coupler assembly described herein can be used with other types of trailers that are towed.

The coupler assembly 100 has an elongate tongue or front arm 115 that extends forwardly from a front end of the support section 15 of the trailer 10. The front arm 115 can be integrally attached to the trailer or it can be a separate piece that is attached to the trailer, such as by welding or with bolts, for example. The front arm 115 is rotatably-attached to an elongate, rotatable coupler arm 110, as described more fully below. The coupler arm 110 has a front end on which is located a coupler device 125 that can removably mate with a towing vehicle (not shown) in a well-known manner for towing the trailer 10. In one embodiment, at least a portion of the coupler arm 110 is a brake actuator cover that has an outer member and an inner member. The trailer 10 can include any of a plurality of trailer components, such as wheels, a retractable jack, support members, etc.

The elongate front arm 115 and coupler arm 110 are pivotably attached to one another, such as in the manner described in U.S. Pat. Nos. 6,364,337 and 5,890,617, and in U.S. patent application Ser. No. 10/382,072, which are incorporated herein by reference in their entirety. It should be appreciated that the front arm 115 and coupler arm 110 can be pivotably attached to one another in manners other than those described herein and in the aforementioned patent documents. As shown in FIG. 2, an exemplary, conventional pivoting coupler assembly 100 includes two tubes 150a, 150b (collectively referred to as tubes 150) that are attached to opposed sides of the coupler arm 110 in a well known manner. The tubes define passageways that align with corresponding holes on plates attached to the front arm 115. The coupler arm 110 swings between a towing orientation and a storage orientation. The trailer can also include a retractable jack, which is shown in FIG. 1 but not in FIG. 2 for clarity of illustration.

Figure 3:
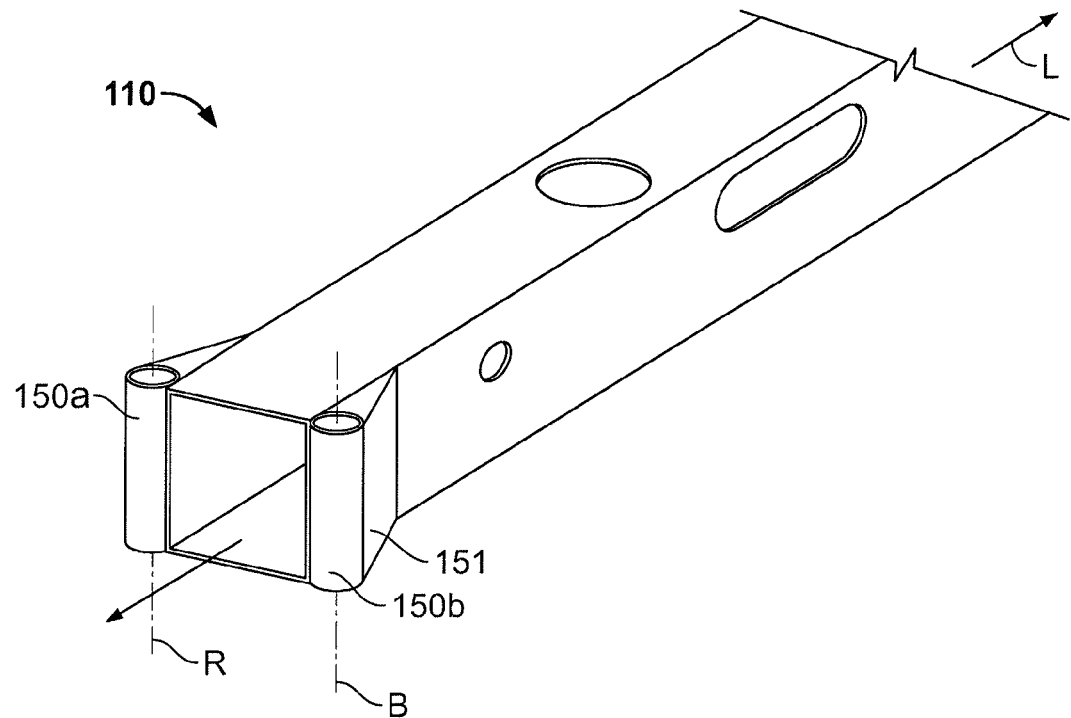
FIG. 3 shows a perspective view of a coupler arm of the coupler device.

FIG. 3 shows a perspective view of the coupler arm 110 disassembled from the front arm 115. The tubes 150 are attached to opposed sides of the coupler arm 110. Reinforcement structures 151, such as gussets, can be attached to the tubes 150 for reinforcing the structural connection between the tubes 150 and the coupler arm 110. The tubes can be integrally formed with the front arm 110 or can be attached to the front arm using any attachment means, such as a weld or bolts.

With reference to FIG. 3, the tube 150a defines a passageway having an axis R and the tube 150b defines a passageway having an axis B. The pair of tubes 150 can also be integrally connected and formed from a single piece of material that is attached to the front arm 110, such as described in U.S. patent application Ser. No. 11/086,823, which is incorporated herein by reference in its entirety.

Figure 4:
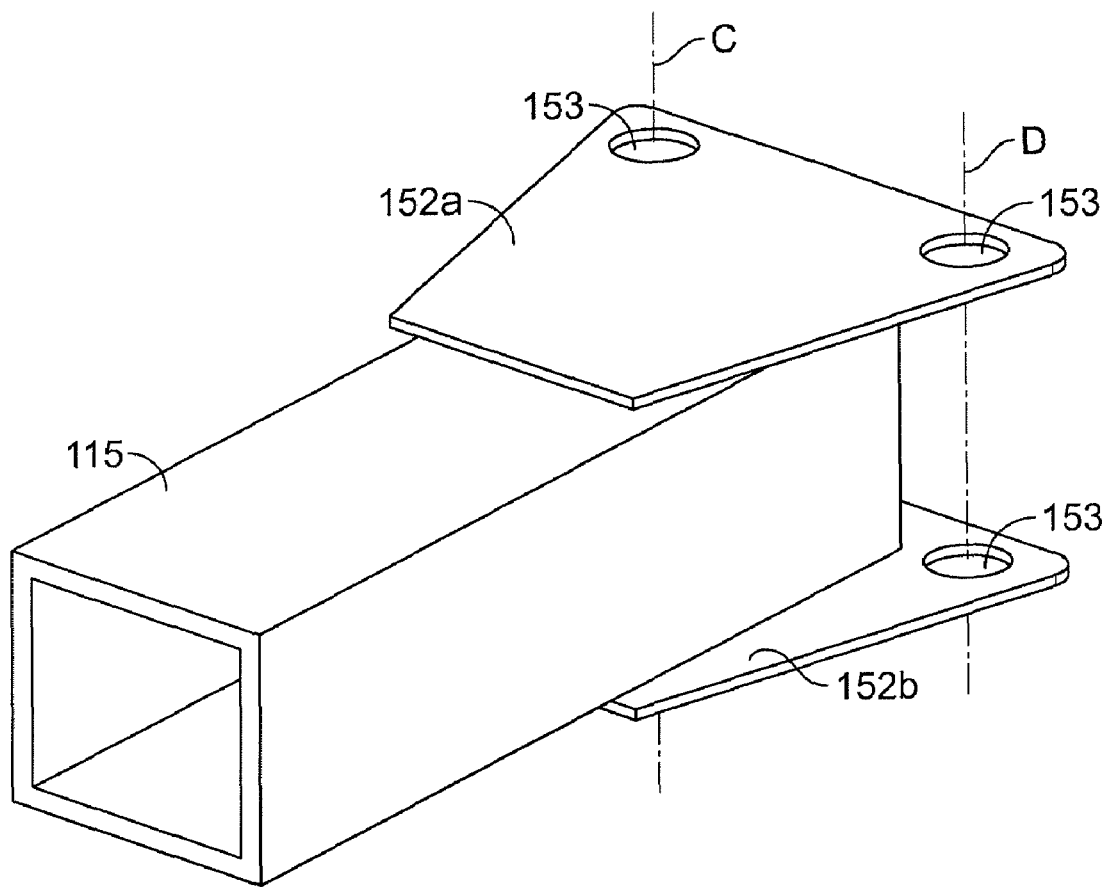
FIG. 4 shows a perspective view of a front arm of the trailer.

With reference again to FIG. 2, plates 152a and 152b (collectively plates 152) are positioned on opposed top and bottom sides of the front arm 115 of the boat trailer 10. FIG. 4 shows a perspective view of the front arm 115 disassembled from the coupler arm 110. For clarity of illustration, the remainder of the trailer 10 is not shown in FIG. 4. Each plate 152 includes a pair of holes 153. The top plate 152a and the bottom plate 152b are positioned on the top and bottom surfaces of the front arm 115 such that the holes 153 in the top plate 152a align with the holes 153 on the bottom plate along axes C and D. The plates 152 are attached to the front arm 115 in any manner, such as by welds, bolts, glue, etc. Alternately, the plates 152 can be integrally attached to the front arm 115.

With reference to FIGS. 2-4, the coupler arm 110 is attached to the front arm 110 by aligning the plates 152 and the tubes 150 such that the axis C (FIG. 4) formed by the holes 153 align with the axis R (FIG. 3) of the tube 150a. Likewise, the axis D (FIG. 4) formed by the holes 153 is aligned with the axis B (FIG. 3) of the tube 150b. Thus, each tube 150 is axially aligned with a corresponding top hole and a corresponding bottom hole of the plates 152. It should be appreciated that the positions of the tubes and plates could be swapped such that the tubes 150 are on the front arm 115 and the plates 152 are on the coupler arm 110 of the trailer 10. Moreover, the coupler arm 110 can be rotatably attached to the front arm 110 in other manners.

With reference to FIG. 2, a pivot pin 156 is positioned through the tube 150a such that the pivot pin 156 couples the tube 150a to the plates 152 and thereby couples the coupler arm 110 to the front arm 115 in a rotating or pivoting manner, as described below. The pivot pin 156 can have flanges or other such structure that retain the pivot pin within the tube 150a and the plates 152. The pivot pin 156 provides an axis of rotation R about which the coupler arm 110 can be rotated relative to the front arm 115 of the trailer 10. When the coupler arm 110 is oriented as shown in FIGS. 1 and 2, the coupler arm 110 is axially aligned with the front arm 115 and with the longitudinal axis of the trailer 10. The coupler arm is in a "towing orientation" in FIGS. 1 and 2 in that the coupler arm 110 can be attached to a towing vehicle for towing the trailer 10.

With reference to FIG. 2, the coupler arm 110 is secured in the towing orientation when a lock pin 158 is positioned in the tube 150b. The lock pin 158 provides an interfering engagement between the tube 150b and the plates 152 to prevent the coupler arm 110 from being rotated out of the towing orientation. The lock pin 158 can be removed from the tube 150b to permit the coupler arm 110 to be rotated out of the towing orientation and into a storage position wherein the coupler arm 110 is positioned transverse or cross-wise to the longitudinal axis of the trailer 10 and the front arm 115.

Figure 5:
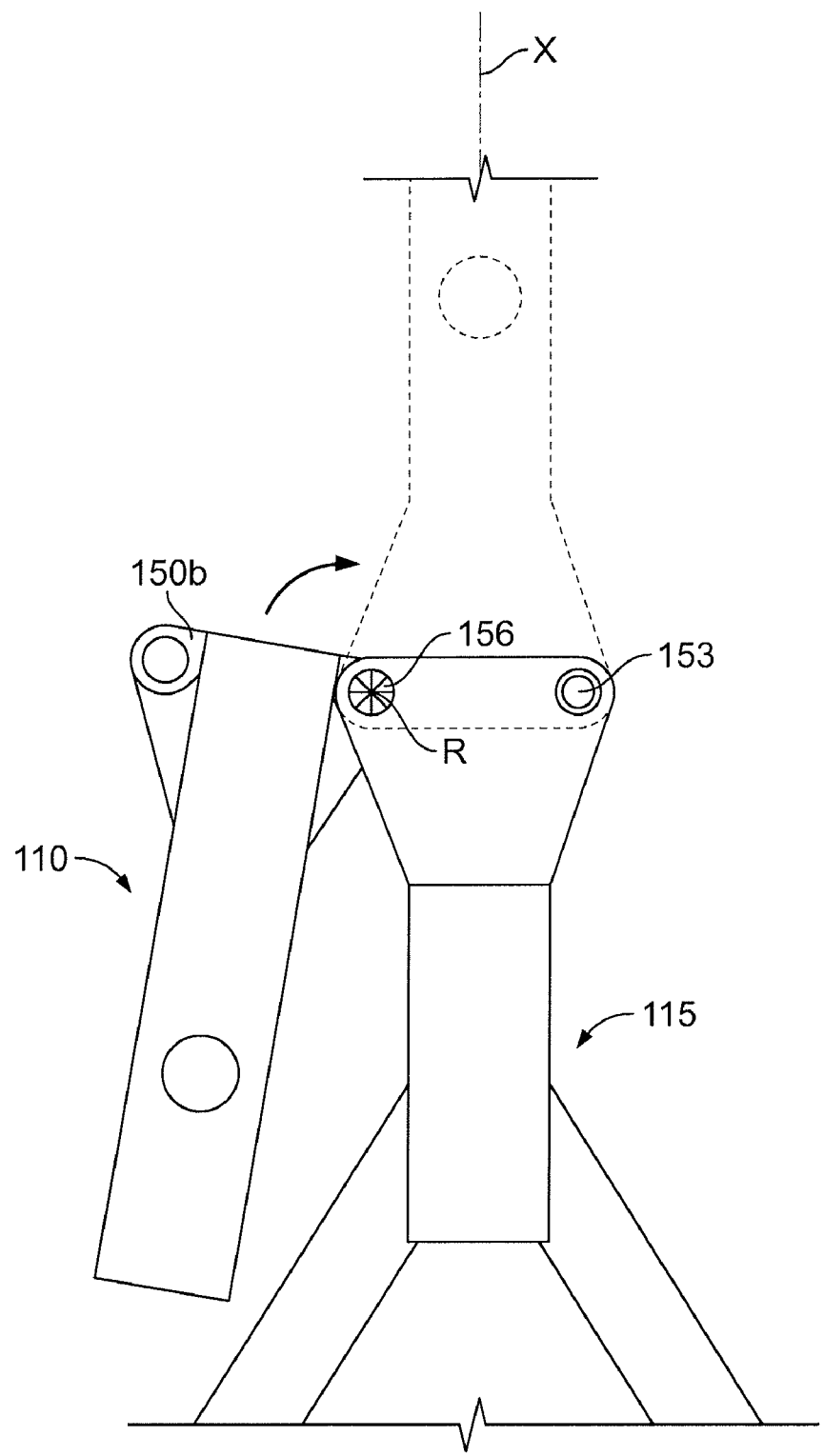
FIG. 5 shows a schematic plan view of the coupler arm of the coupler device in a storage position and in a towing position.

FIG. 5 shows a schematic, top plan view of the coupler arm in the storage orientation and in the towing orientation. FIG. 5 shows the coupler arm 110 in solid lines in the storage orientation. When in the storage orientation, the coupler arm 110 is positioned transverse or cross-wise relative to a longitudinal axis of the trailer 10 and the front arm 115. In this manner, the coupler arm 110 does not contribute to the overall length of the trailer 10 when in the storage position. As mention, the coupler arm 110 moves to the storage orientation by rotating about an axis of rotation R defined by the pivot pin 156.

FIG. 5 also shows the coupler arm 110 in the towing orientation (in phantom lines). When in the towing orientation, the coupler arm 110 is axially aligned with the front arm 115 such that the coupler arm 110 contributes to the overall length of the trailer 10. With the coupler arm 110 in the towing position, the coupler member of the coupler arm 110 can be attached to a towing vehicle for towing the trailer.

In this manner, when not in use, the coupler arm 110 can be rotated about the axis R (shown in FIGS. 3 and 5) to the storage orientation wherein the coupler arm 110 does not increase the overall longitudinal length of the trailer. The coupler arm 110 can also be rotated about the pivot pin 156 back to the towing orientation when it is desired to tow the trailer.

As mentioned, the coupler arm is moved to the storage position by removing the lock pin 158 from the tube 150b to disengage the lock pin 158 from the plates 152. The coupler arm 110 is locked in the towing position when the lock pin 158 is positioned in the tube 150b. It should be appreciated that the lock pin 158 is desirably stored in a readily-available location when the lock pin 158 is not in the tube 150b. If the lock pin 158 is lost, then it is not possible to lock the coupler arm 110 in the towing position.

Figure 6:
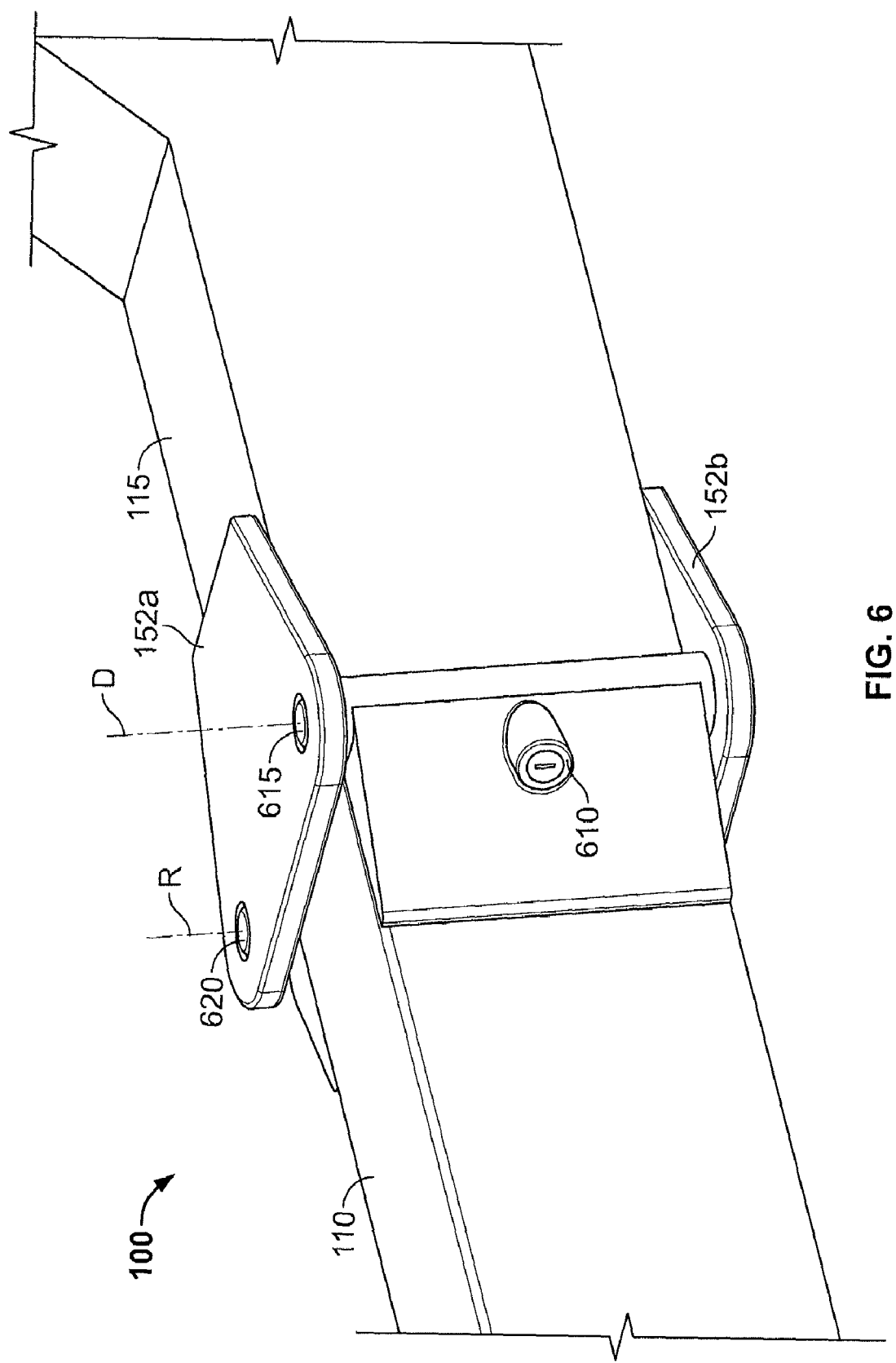
FIG. 6 shows an enlarged view of a locking system for a pivoting trailer coupler device.

There is now described a lock mechanism that can be used to replace the lock pin 158 and/or the pivot pin 156. FIG. 6 shows a perspective view of a coupler assembly 100 that incorporates a locking mechanism that can be used to replace the removable lock pin 156. The locking mechanism includes an actuator 610 that is actuated to move a lock member, such as a lock pin 615, between a locked or extended position and an unlocked or retracted position. When in the extended position, the lock pin 615 extends outwardly so as to lock the coupler arm 110 in a predetermined orientation, such as in a towing orientation (as shown in FIG. 6). When in the unlocked or retracted position, the lock pin 615 is retracted so that the lock pin 615 does not lock the orientation of the coupler arm 110, as described in more detail below. When in the locked or extended position, the lock pin 615 locks the coupler arm 110 in the towing orientation. The lock pin 615 can be fixedly mounted in the coupler assembly so that it does not have to be removed when in the unlocked position. Although it is fixedly mounted, the lock pin 615 can still transition between a locked an unlocked state, as described below.

It should be appreciated the lock member of locking mechanism does not necessarily have to be a pin. The locking mechanism can use any type of structure that engages the coupler arm for locking the coupler arm in a predetermined orientation. For example, the lock pin could be replaced with clip, an arm, or any structure that engages the coupler arm when actuated by the actuator. Thus, the portion of the locking mechanism that locks with the coupler arm can be any structure and need not be pin-shaped.

The actuator 610 is actuated, for example, by inserting a key into a key hole in the actuator 610 and turning the key. In one embodiment, the actuator 610 only works when a predetermined key is inserted. It should be appreciated that the actuator 610 is not limited to use with a key, although a key provides a security advantage such that a user without the key cannot actuate the locking mechanism.

FIG. 6 shows the locking mechanism with the lock pin 615 in the extended position. The length of the pin 615 is extended to a length sufficient to protrude through a corresponding member on the front arm 115 to which the lock pin 615 locks It should be appreciated that the lock pin 615 does not necessarily extend all the way through a hole in the upper plate. The upper surface of the plate can be uninterrupted without a hole, while a lower surface of the plate can include a cavity that receives the lock pin when extended.

In the embodiment of FIG. 6, the lock pin 615 is extended outwardly along an axis D such that the lock pin 615 extends at least partially through a top and/or bottom plate 152 of the front arm 115 of the trailer. The lock pin 615 thereby provides an interfering engagement with the plate(s) 152 to prevent the coupler arm 110 from being rotated out of the towing orientation. When the locking mechanism is unlocked, the lock pin 615 retracts such that the lock pin 615 does not protrude outward through the plates 152 and does not impede the coupler arm 110 from rotating into and out of the towing orientation. Thus, when the locking mechanism is unlocked, the coupler arm 110 can rotate about an axis R defined by a pivot pin 620.

Figure 7:
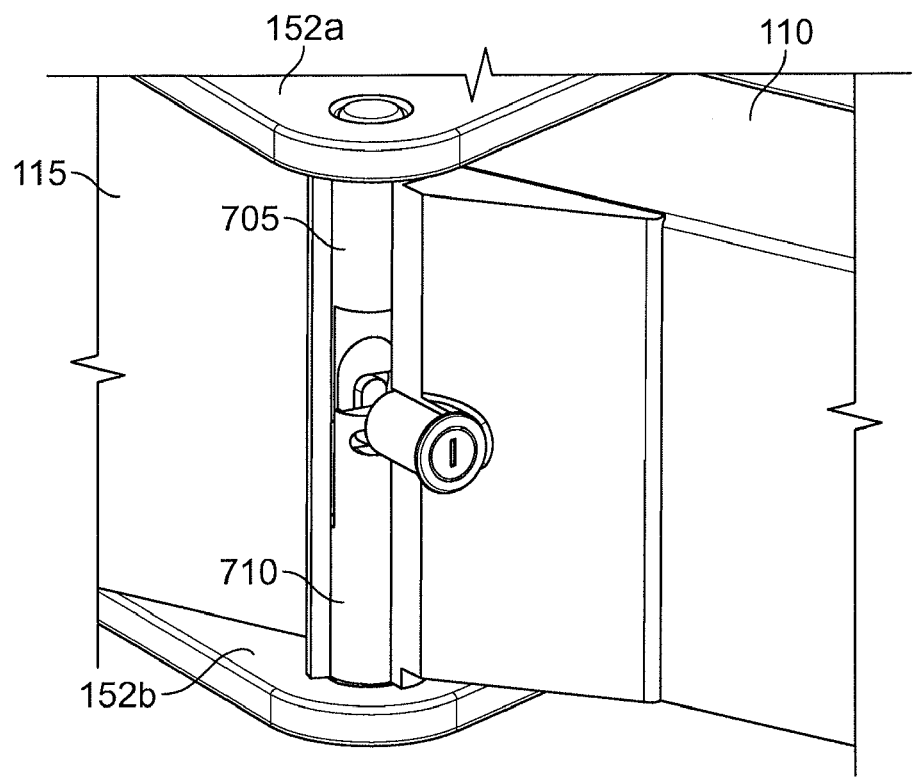
FIG. 7 shows a partial cross-sectional view of the locking system.
Figure 8:
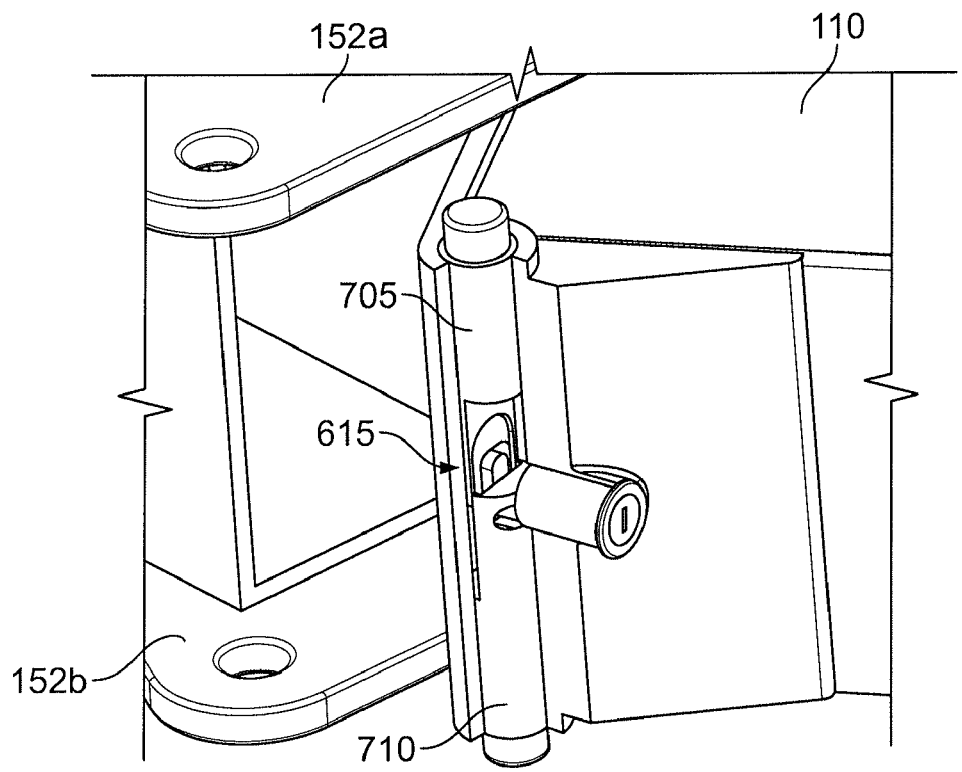
FIG. 8 shows a partial cross-sectional view of the locking system.

FIG. 7 shows a partial cross-sectional view of the locking mechanism in a locked position with the lock pin 615 extended outward to protrude through the plates 152. FIG. 8 shows a partial cross-sectional view of the locking mechanism in a locked position with the lock pin 615 extended outward. In FIG. 8, the coupler arm 110 is rotated out of the towing orientation to provide a clear view of the lock pin 615 in the extended position. When the locking mechanism is locked, an upper portion 705 of the lock pin 615 is positioned in an upwardly extended position to a length sufficient to protrude into the upper plate 152a. Likewise, a lower portion 710 is positioned in a downwardly-extended position to a length sufficient to protrude into the lower plate 152b. Alternately, the pin 615 can extend only upward or only downward to interfere with only one of the top or bottom plates. As mentioned, the lock pin 615 is moved between the locked and unlocked positions by actuating the actuator 610.

Figure 9:
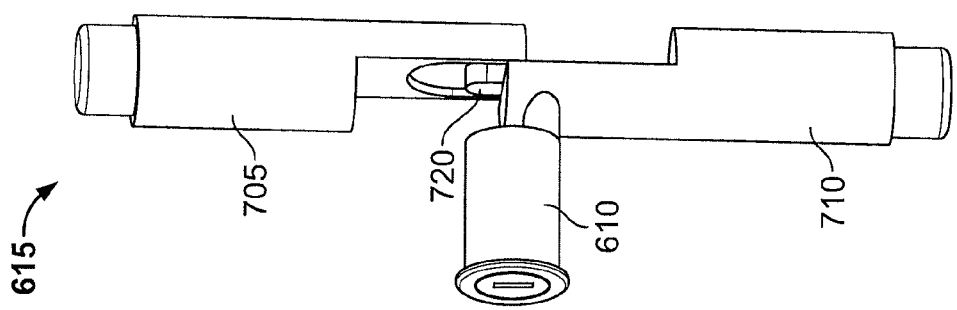
FIG. 9 shows a perspective view of an exemplary embodiment of a locking mechanism.

FIG. 9 shows a perspective view of an exemplary embodiment of a locking mechanism. The locking mechanism includes a lock pin 615 comprised of an upper portion 705 and a lower portion 710. An actuator 610 is coupled to the upper portion 705 and the lower portion 710. The actuator 610 is actuated to cause the upper portion 705 and lower portion 710 to extend outwardly along the axis D (FIG. 6) so as to increase the overall length of the lock pin 615 along the axis D. The actuator 610 can also be actuated to cause the upper and lower potions to retract along the axis D to decrease the overall length of the lock pin 615. In one embodiment, the actuator 610 comprises a tumbler device that is coupled to a cam mechanism 720. When the tumbler device is rotated, such as by using a key, the cam mechanism 720 moves to cause the upper and lower portions of the lock pin 615 to extend or retract as desired.

It should be appreciated that the pivot pin 620 (shown in FIG. 6) can also be replaced with a pin controlled by a lock mechanism of the type described herein. Thus, a lock mechanism would be positioned on both sides of the front arm/coupler arm connection such that a lock mechanism controls both the pivot pin 620 and the lock pin 615. This would permit the coupler arm 110 to pivot in both directions as the user's discretion. In other words, both the axis R and the axis D could serve as pivoting axes depending on which of the pins is locked.

Figure 10:
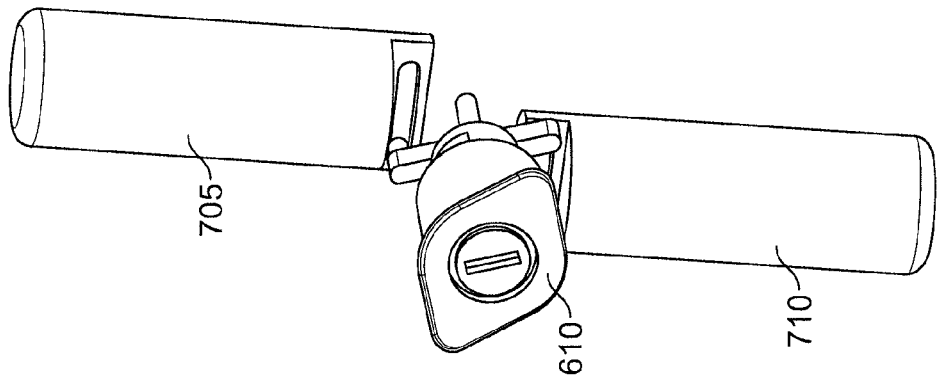
FIG. 10 shows a perspective view of another embodiment of a locking mechanism.

In the embodiment shown in FIG. 9, the upper portion 705 and the lower portion 710 of the pivot pin 615 are aligned on a common axis. When the lock pin 615 is extended/retracted, the upper portion and lower portion slide along the common axis. FIG. 10 shows another embodiment wherein the upper portion 705 and the lower portion 710 are not co-axially aligned. That is, the upper portion 705 extends along a first axis and the lower portion 710 extends along a second axis wherein the first and second axes are offset from one another. When such an embodiment is used, the holes in the upper plate 152a and lower plate 152b should also be offset to align with the offset axes.

It should be appreciated that the extending/retracting pin of the lock mechanism can be incorporated into various types of pivoting trailer coupler assemblies and it is not limited to use with the particular structural embodiments described above. For example, the lock mechanism can be incorporated into a pivoting coupler device wherein the tubes 150 and plates 152 are replaced with interlocking knuckles. FIG. 11 shows a pivoting coupler assembly wherein the front arm 115 and coupler arm 110 each include interlocking knuckles or barrel hinges 1005 that define pivoting or locking shafts for receipt of pins. The hinges 1005 are aligned in an interlocking manner such that the shafts of the hinges 1005 are aligned for receipt of the lock pin 615 on a lock mechanism. At least one of the hinges 1005 on either side of the arms can be equipped with a lock mechanism that permits a pin to be retracted and extended for engaging the other knuckles along a common or offset axis.

Figure 12:
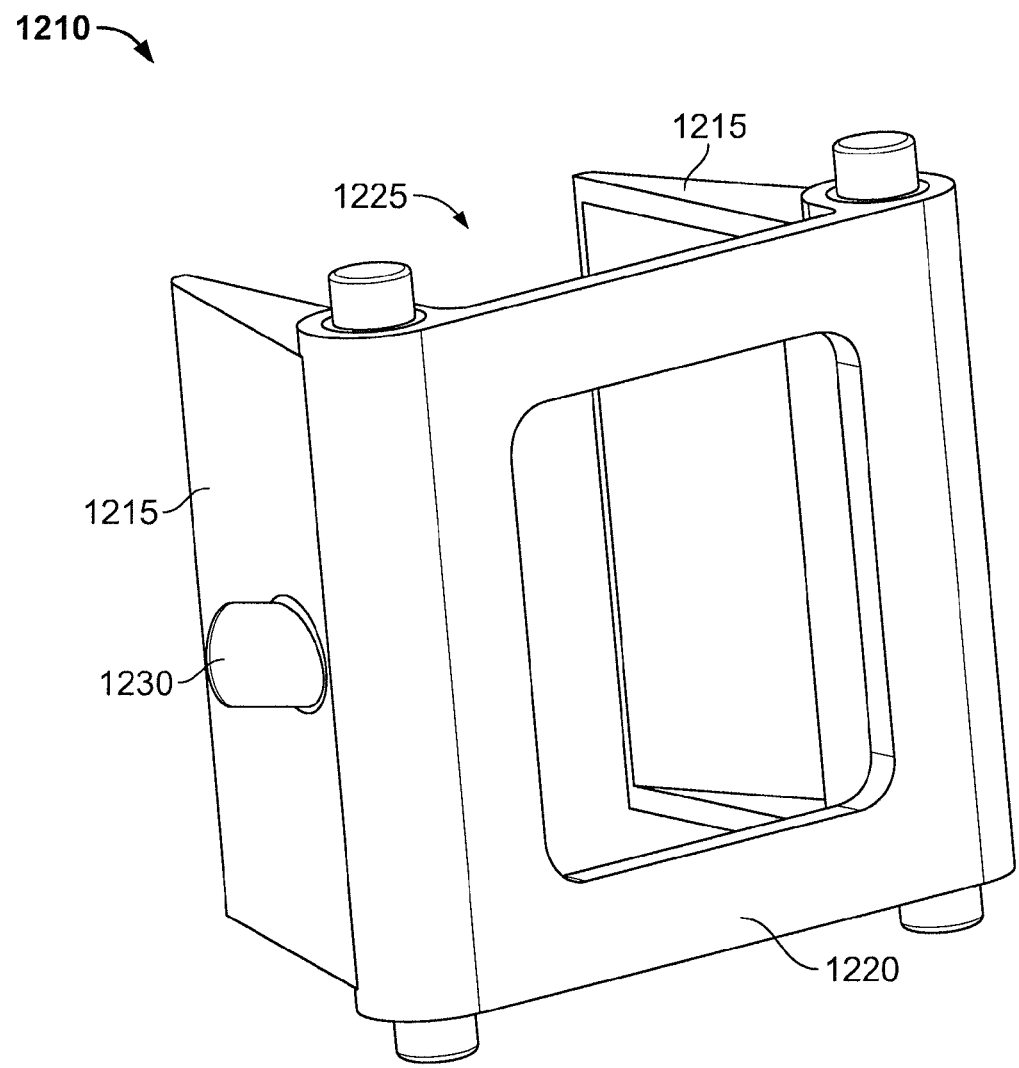
FIG. 12 shows an embodiment of a device that can be positioned on the end of an arm to convert the arm into a pivoting coupler arm having a lock mechanism of a type described herein.

FIG. 12 shows an embodiment of a device 12010 that can be positioned on the end of an arm to convert the arm into a pivoting coupler arm having a lock mechanism of a type described herein. The "arm" can be any elongated device, such as a tube, a truss, a rod, a bar, etc. that is suitable for use as a front arm or coupler arm of a trailer. The device 1210 includes a pair of side walls 1215 and a front wall 12120 that define a cavity 1225 sized and shaped to receive the end of an arm that will server as the coupler arm or front arm. A lock mechanism 1230 of the type described above is located in one or both of the side walls for actuating lock pins. In use, the end of the arm that will serve as the coupler arm is positioned inside the cavity and the device 1210 is secured thereto, such as by using a weld, bolts, adhesive, etc. With the device 1210 secured to the arm, the arm is now equipped with extending and retracting lock pins. As mentioned, the lock pins can also be positioned on the front arm of the trailer with the plates positioned on the coupler arm.

Figure 14:
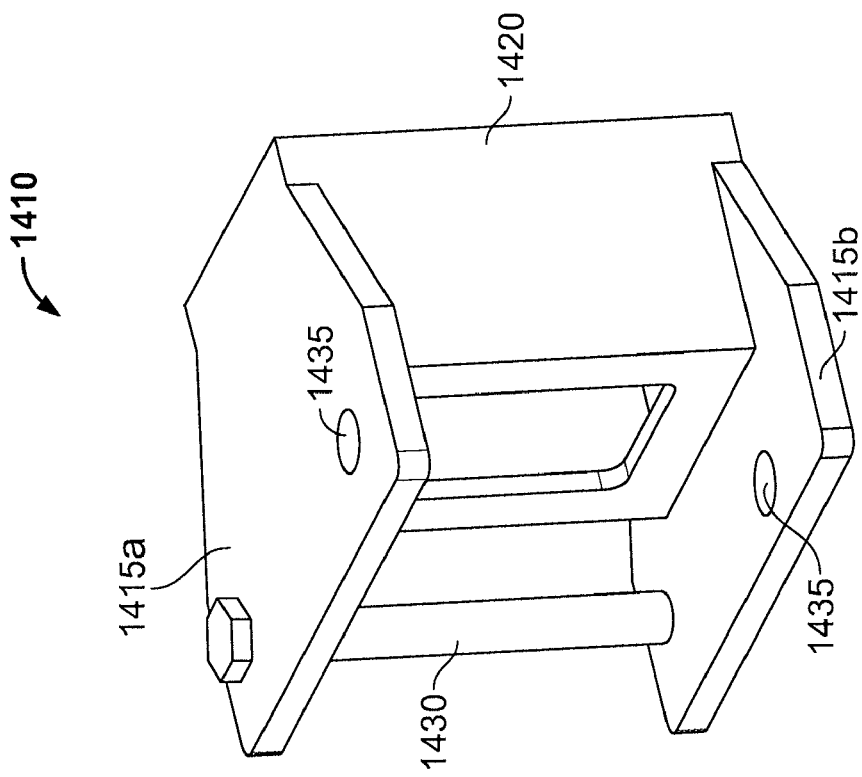
FIGS. 13 and 14 show alternate embodiments of devices that can be positioned on the ends of arms to convert the arms into a pivoting coupler arm.
Figure 13:
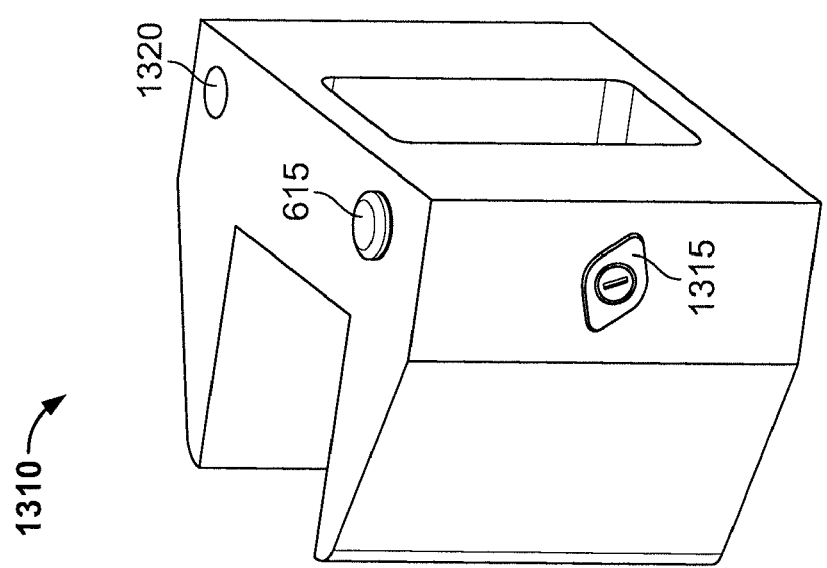

FIGS. 13 and 14 show perspective views of converter devices that can be attached to the ends of elongate arms to convert the arms into a pivoting coupler assembly. FIG. 13 shows a converter device 1310 that is similar to the device shown in FIG. 12. In the embodiment of FIG. 13, the device 1310 has a lock mechanism 1315 only on a single side with the lock mechanism controlling an extendable/retractable lock pin 615. The opposite side of the device 1310 has a shaft 1320 that is configured to receive a pivot pin for interfacing with a portion of a corresponding arm of the pivoting coupler assembly. The device 1310 can be fitted on the end of an arm to convert the arm into one of the arms of a pivoting coupler assembly.

FIG. 14 shows a corresponding device 1410 that can be positioned on the opposite arm of the coupler assembly. The device 1410 has an upper plate 1415a and a lower plate 1415b that are integrally attached to a housing 1420. The housing 1420 is configured to receive the end of an arm for converting the arm into one of the arms of a pivoting coupler assembly. A pivot pin 1430 is located on the device 1410 for positioning in a corresponding shaft of the opposite arm in the assembly, such as the shaft 1320 of the device 1310 shown in FIG. 13. The upper and lower plates have holes 1435 that are positioned to receive therein a lock pin, such as the retractable/extendable lock pin 615 of the device 1310 shown in FIG. 13.

Figure 15:
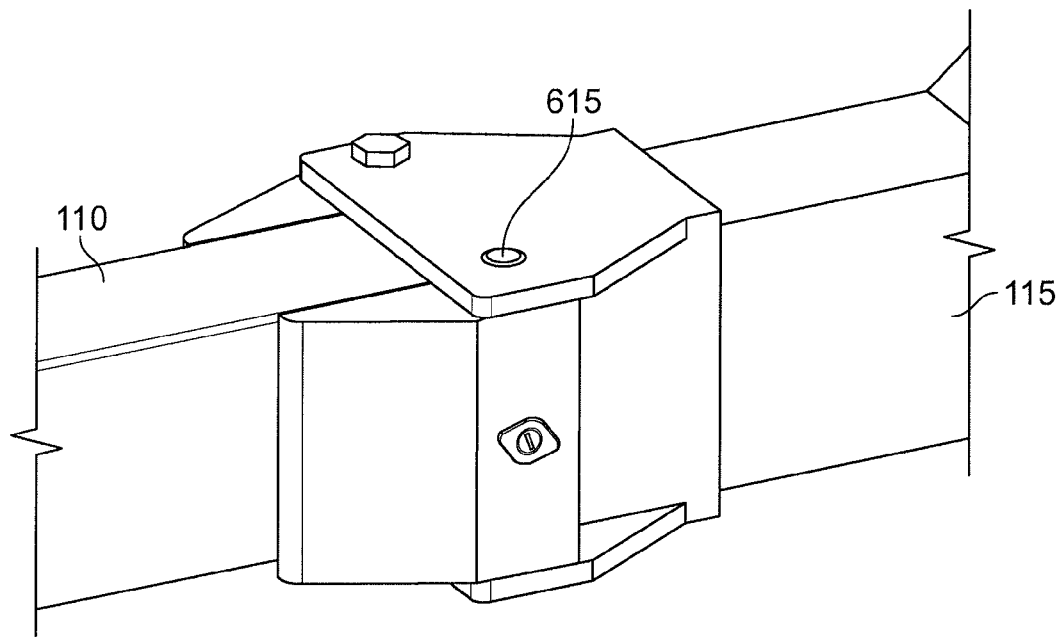
FIG. 15 shows the devices of FIGS. 13 and 14 attached to a coupler arm and a front arm, respectively, to form a pivoting coupler assembly.

FIG. 15 shows the devices 1310, 1410 attached to a coupler arm 110 and a front arm 115, respectively, to form a pivoting coupler assembly. At least one lock mechanism is configured to cause the lock pin 615 to extend and retract into the locked and unlocked positions.

Figure 16:
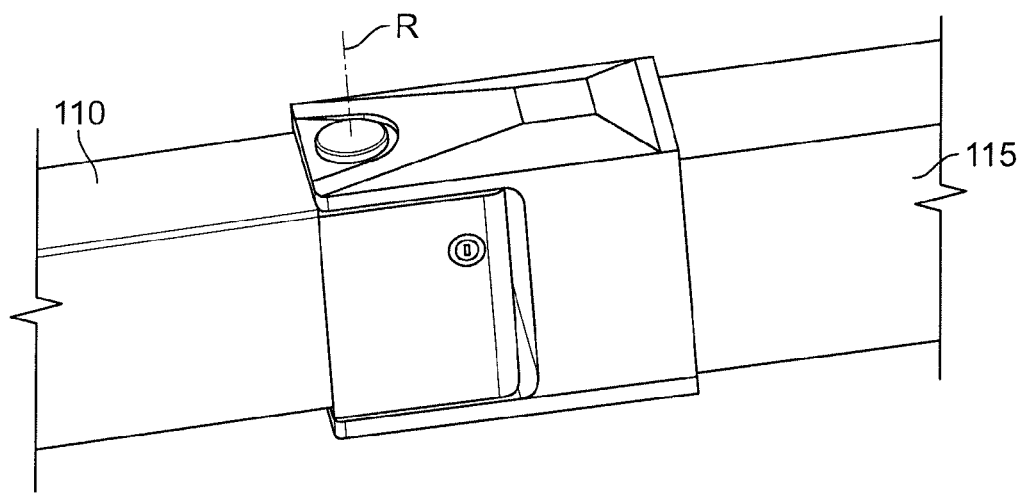
FIG. 16 shows a perspective view of another embodiment of a pivoting coupler assembly for a trailer.
Figure 17:
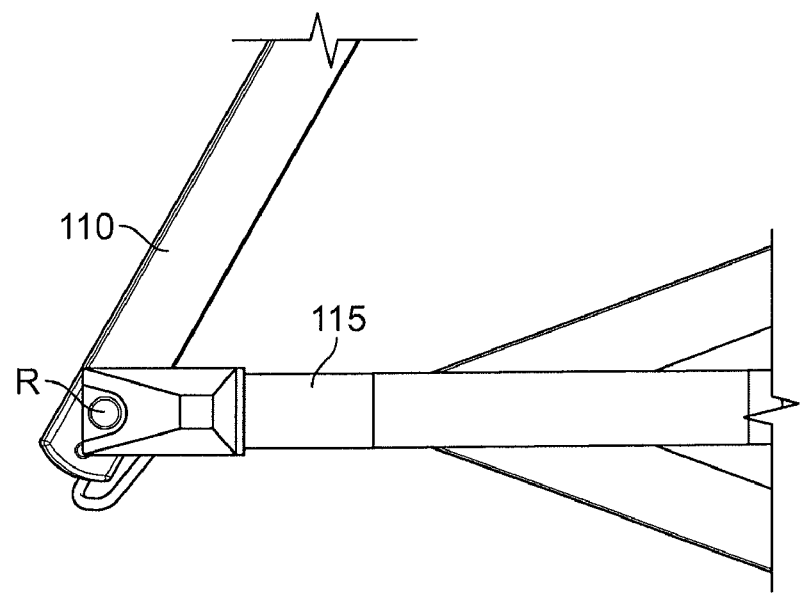
FIG. 17 shows a top view of the assembly of FIG. 16 with a coupler arm in a storage orientation.

FIG. 16 shows a perspective view of another embodiment of a pivoting coupler assembly for a trailer. In this embodiment, the axis of rotation R of the coupler arm 110 is positioned along the centerline (or offset from the centerline) of the coupler arm 110 rather than along the side of the coupler arm as in the previous embodiments. As shown in the top view of FIG. 17, the coupler arm 110 can rotate about the axis of rotation R so as to move to the storage orientation.

Figure 18:
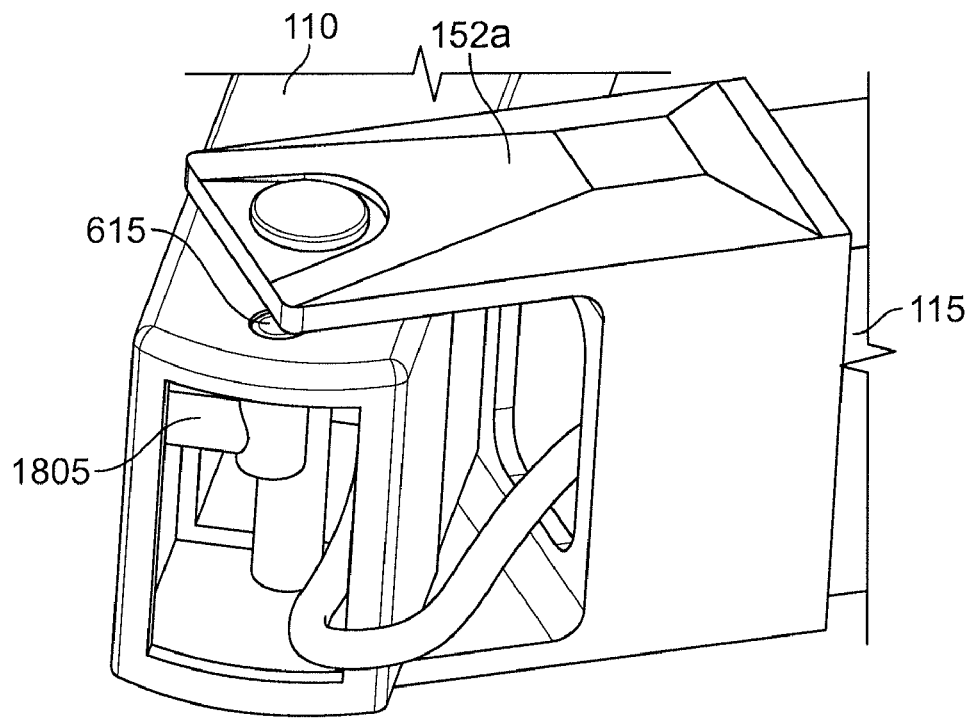
FIG. 18 shows an enlarged, close-up view of the assembly of FIG. 16 with the coupler arm in the storage orientation.

FIG. 18 shows an enlarged, close-up view of the assembly with the coupler arm 110 in the storage orientation. A locking mechanism 1805 is configured to cause a lock pin 615 to extend into engagement with a portion of the front arm 115, such as to engage an upper plate 152a so as to lock the coupler arm 110 in a towing orientation. The locking mechanism 1805 can also be actuated to retract the lock pin 615 to unlock the coupler arm 110 from the towing orientation.

Thus, there has been described a lock mechanism that can be used to lock a coupler arm of a swing-away trailer coupler assembly into a towing orientation. The lock mechanism includes an actuator that is actuated to move a lock pin between a locked and an unlocked position. In the locked position, the lock pin provides an is extended outward, such as to provide interfering engagement that prevents the coupler arm from being moved into or out of the towing orientation. In the unlocked position, the lock pin retracts such that it does not interfere with the coupler arm being rotated into or out of the towing orientation. It should be appreciated that the lock mechanism described herein can be used with any type of swing-away trailer coupler assembly that uses a lock pin.

Figure 19:
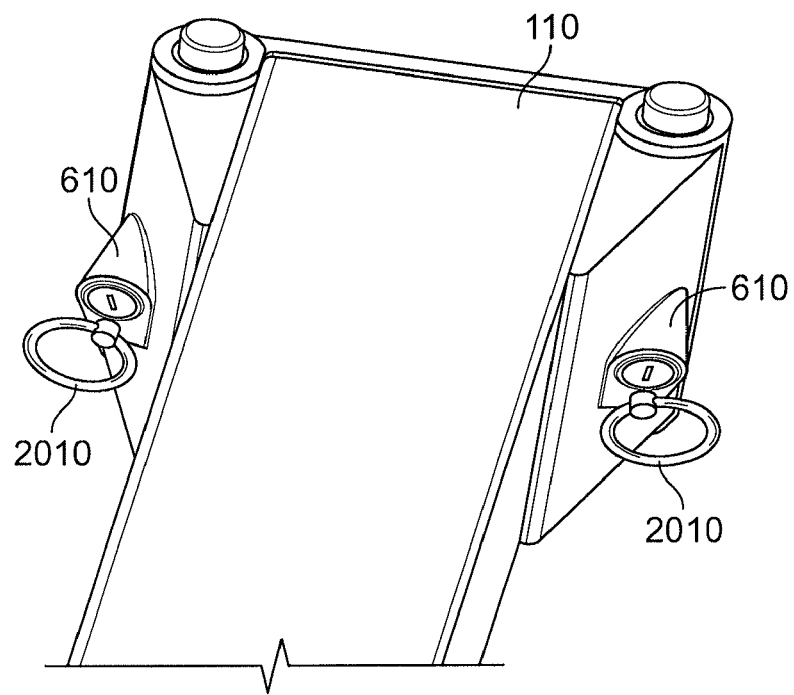
FIG. 19 shows a top, perspective view of a pair of lock assemblies positioned on both sides of a coupler arm.
Figure 20:
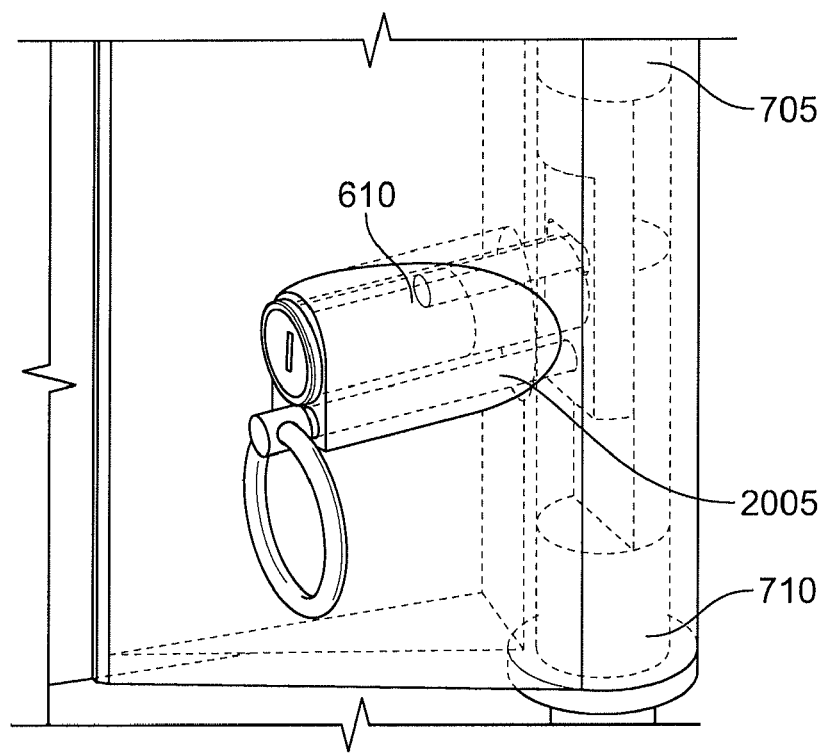
FIG. 20 shows a partial cross-sectional view of the lock assembly.

FIG. 19 shows a top, perspective view of a pair of lock assemblies positioned on both sides of a coupler arm 110. FIG. 20 shows a partial cross-sectional view of the lock assembly. A safety member 2005, such as a pin, removable inserts into the lock assembly and mates with both the upper portion 705 and the lower portion 710 of the pin. The safety member 2005 can have a handle 2010 for grasping of the safety member 2005. The handle 2010 is shown as being a ring, although it should be appreciated that the shape and structure of the handle 2010 can vary. For example, the handle 2010 can be a lanyard.

When position in the lock assembly the safety member 2005, the safety member 2005 engages both the upper portion 750 and the lower portion 710 of the extendable pin. The safety member prevents the upper portion and lower portion from moving to the retracted state to thereby further lock the pin in the extended state. It should be appreciated that the pin is fixed in the extended state when the actuator key is turned. However, the safety member can be used to provide additional security for retaining the pin in the extended state.

Figure 21:
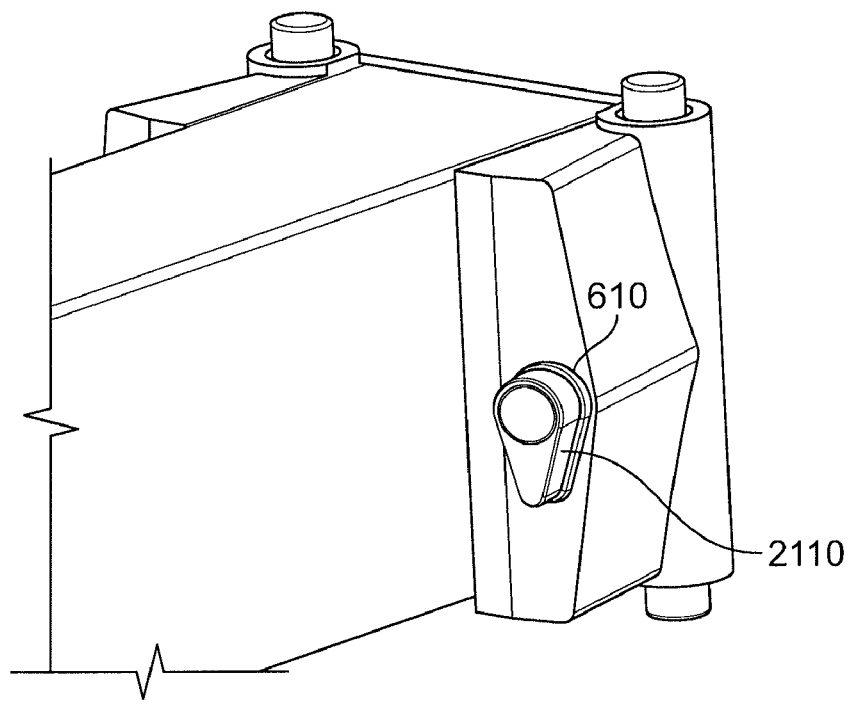
FIGS. 21 and 22 show another embodiment of the assembly.
Figure 22:
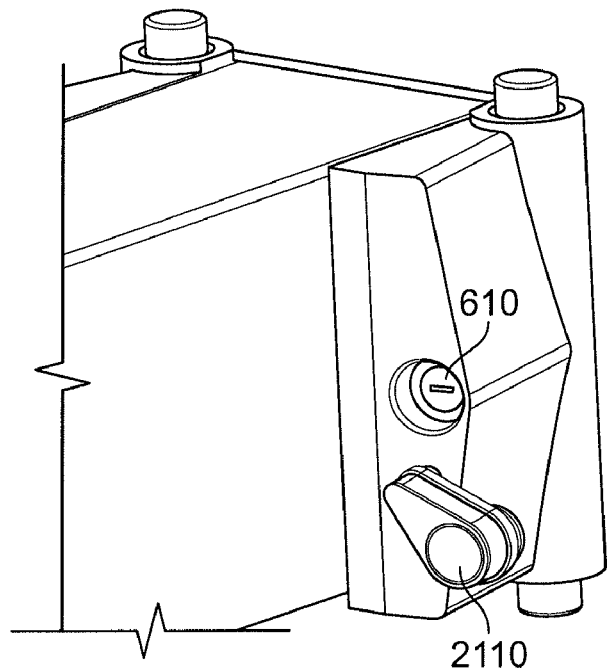

FIGS. 21 and 22 show another embodiment with a safety member wherein a plug member 2110 is positioned on the tip of the safety member. The plug member 2110 rotates about the safety member to a plugged orientation (FIG. 21) wherein the plug member 2110 covers at least a portion of a keyhole of the actuator 610. When in the plugged orientation, the safety member 2005 (FIG. 20) engages the extendable pin in the locked position. The plug member 2110 also rotates to an unplugged orientation as shown in FIG. 22 wherein the safety pin is disengaged from the safety member.

A number of embodiments have been described. Nevertheless, it will be understood that various modifications may be made without departing from the spirit and scope of the claims. Accordingly, other embodiments are within the scope of the following claims.

The invention claimed is:

1. An assembly for attaching a trailer to a towing vehicle, comprising:
   a coupler arm having a front end and a rear end, the front end of the coupler arm configured for attachment to a towing vehicle;
   a front arm having a rear end adapted to be attached to a front of the trailer and a front end rotatably attached to the rear end of the coupler arm, wherein the coupler arm rotates relative to the front arm between (1) an operating position wherein the front arm and the coupler arm extend along a common longitudinal axis, and (2) a stow position wherein the coupler arm is oriented cross-wise to the front arm;
   a lock member movable into a locked state wherein the lock member locks the front arm in the operating position, the lock member being fixedly mounted to the assembly;
   an actuator coupled to the lock pin, wherein the actuator is actuated to cause the lock member to move into the locked state;
   wherein the lock member comprises a pin, and wherein the pin extends outward to lock with the coupler arm when in the locked state.

2. An assembly as in claim 1, wherein the lock member engages a portion of the coupler arm when in the locked state.

3. An assembly as in claim 1, wherein the actuator is further actuated to cause the lock member to move into an unlocked state, wherein the coupler arm is free to move between the operating position and stow position when the lock member is in the unlocked state.

4. An assembly as in claim 1, wherein the actuator includes a key hole that accepts a key for actuating the actuator.

5. An assembly as in claim 1, wherein the lock member is attached to the coupler arm.

6. An assembly as in claim 1, wherein the lock member is attached to the front arm.

7. An assembly as in claim 1, wherein the lock member comprises a pin that transitions between an extended state of elongated length when locked and a retracted state of reduced length when unlocked.

8. A trailer, comprising:
   a support section configured to support a load;
   a front arm extending forwardly from the support section;
   a coupler arm rotatably attached to the front arm, the coupler arm configured to be attached to a towing vehicle, wherein the coupler arm rotates relative to the front arm between (1) an operating position wherein the front arm and the coupler arm extend along a common longitudinal axis, and (2) a stow position wherein the coupler arm is oriented cross-wise to the front arm;
   a lock assembly fixedly attached to the trailer, the lock assembly including:
      (a) a lock member that engages the coupler arm to lock the coupler arm in the operating position;
      (b) an actuator that is actuated to cause the lock member to engage the coupler arm;
   wherein the lock member comprises a pin.

9. A trailer as in claim 8, wherein the actuator is actuated by turning a key that is inserted into the actuator.

10. A trailer as in claim 8, wherein the lock assembly is attached to the coupler arm.

11. A trailer as in claim 8, wherein the lock assembly is attached to the front arm.

12. A trailer as in claim 8, wherein the actuator can be further actuated to cause the lock member to disengage the coupler arm to unlock the coupler arm to permit the coupler arm to move between the operating position and stow position.

13. An assembly for attaching a trailer to a towing vehicle, comprising:
   a coupler arm having a front end and a rear end, the front end of the coupler arm configured for attachment to a towing vehicle;
   a front arm having a rear end adapted to be attached to a front of the trailer and a front end rotatably attached to the rear end of the coupler arm, wherein the coupler arm rotates relative to the front arm between (1) an operating position wherein the front arm and the coupler arm extend along a common longitudinal axis, and (2) a stow position wherein the coupler arm is oriented cross-wise to the front arm;
   a lock member movable into a locked state wherein the lock member locks the front arm in the operating position, the lock member being fixedly mounted to the assembly;
   an actuator coupled to the lock pin, wherein the actuator is actuated to cause the lock member to move into the locked state wherein the actuator includes a key hole that accepts a key for actuating the actuator.

14. A trailer, comprising:
   a support section configured to support a load;
   a front arm extending forwardly from the support section;
   a coupler arm rotatably attached to the front arm, the coupler arm configured to be attached to a towing vehicle, wherein the coupler arm rotates relative to the front arm between (1) an operating position wherein the front arm and the coupler arm extend along a common longitudinal axis, and (2) a stow position wherein the coupler arm is oriented cross-wise to the front arm;

a lock assembly fixedly attached to the trailer, the lock assembly including:

(a) a lock member that engages the coupler arm to lock the coupler arm in the operating position;

(b) an actuator that is actuated to cause the lock member to engage the coupler arm wherein the actuator is actuated by turning a key that is inserted into the actuator.

* * * * *